March 16, 1937. P. C. WARREN Re. 20,300

REFRIGERATOR

Original Filed Dec. 9, 1931 2 Sheets-Sheet 1

Witness:
Chas. L. Kourch

Inventor,
Paul C. Warren
Offield, McCulloch, Potts & Fitzgerald
Attys.

March 16, 1937. P. C. WARREN Re. 20,300

REFRIGERATOR

Original Filed Dec. 9, 1931 2 Sheets-Sheet 2

Witness:
Chas. L. Konsels

Inventor,
Paul C. Warren
Offield, McElhose, Sesser & Fitzgerald
Attys.

Reissued Mar. 16, 1937

Re. 20,300

UNITED STATES PATENT OFFICE 20,300

REFRIGERATOR

Paul C. Warren, Lakeside, Mich.

Original No. 1,943,646, dated January 16, 1934, Serial No. 579,878, December 9, 1931. Application for reissue January 14, 1936, Serial No. 59,154

4 Claims. (Cl. 62—66)

This invention relates to improvements in refrigerators, and more particularly to an improved arrangement for circulation of air and the storage of the food and other perishable commodities within refrigerators.

The object of the invention is to promote economy and increased efficiency in the maintenance and operation of refrigerators, first, by providing for a well defined and positive circulation of the refrigerated air within the cooling space, and again by dividing the cooling or storage space into a number of drawer-like compartments so constructed as to permit the free circulation of air through their walls when in closed position, but becoming imperforate when the drawer is withdrawn to prevent the loss and dissipation of the cold air within it.

A practical embodiment of these and other novel features and advantages is illustrated in the accompanying drawings, in which Figure 1 is a perspective view of a refrigerator of the mechanical type constructed in accordance with my invention;

Figure 1:
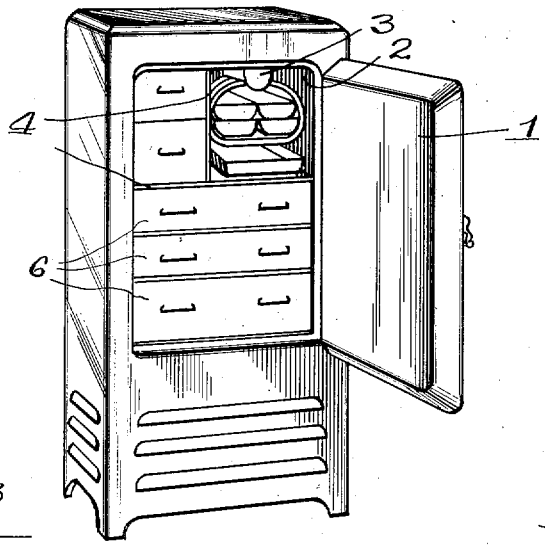

Inasmuch as the improved features of construction are applicable to any and all types and kinds of refrigerating devices, the present disclosure is illustrative of its application to a mechanical type of refrigerator consisting of the usual upright body of insulated walls enclosing a single large compartment accessible through a single door 1 extending the full height thereof. The interior of the compartment is subdivided into a small compartment 2 in one of the upper corners for the cooling or refrigerating unit 3 of any standard design, while the remaining space is available for storage. The apparatus for maintaining the refrigerating unit at the required cooling temperature is located either in a separate compartment below the storage compartment or located remotely from the refrigerator.

The space occupied by the refrigerating unit 3 is separated from the remainder of the space by a transverse partition wall 4 and a vertical wall 4*a*, these walls terminating short of the side and top walls of the refrigerating compartment in order to maintain free circulation of the air about the storage space and to and from the refrigerating unit compartment. In addition to the partition wall 4, there is a vertical wall 4*a* forming a continuation of the transverse partition wall 4, and extending downwardly along the right side of the storage space at a distance inwardly from the side wall and terminating short of the bottom wall.

The remainder of the space within the main compartment, that is, below and to one side of the refrigerating unit compartment is divided into a plurality of small compartments in the form of sliding drawers 6, 6 for the storage of foods and food products in place of the usual arrangement of shelves used for this purpose. Thus as shown, the space below the refrigerating unit contains three drawers 6 of full width, while the small space at one side of the unit may be either occupied by smaller drawers or a separate shelved compartment, as desired. For the purpose of this disclosure, however only the main drawer structure will be considered with particularity. Considerable latitude is permitted in the mounting of the drawers 6, a suitable frame 7 being preferably erected within the refrigerator for slidably supporting the drawers, the same being either a permanent fixture or one that is assembled within the space and capable of removal if desired.

Briefly then, the drawer supporting frame 7 consists of vertical and horizontal angle-iron members 7*a* and 7*b*, respectively, the horizontal members forming slideways for the drawers which may be equipped with rollers or other means for promoting ease of movement, all of which are well-known expedients in the art and therefore need not be shown in detail.

The drawers therefore extend the full width of the door opening, thus leaving vertical spaces 8 between their side walls and the adjacent inner walls of the refrigerator for the circulation of the cold air from the cooling unit compartment above. Likewise there is a space 9 beneath the lowermost drawer which connects the lower ends of the vertical side passages, while a corresponding passage 10 at the top completes the circuit from the space occupied by the refrigerating unit, around the drawers and return.

Each drawer 6 as already suggested is a receptacle for the articles of food to be preserved at the temperature within the refrigerator, and as such are preferably made of sheet metal open at the top and having louvered or partially open side and bottom walls so that the cold air can circulate freely through the same. Moreover the drawers are provided with sliding plates or panels so designed that upon sliding the drawer from the refrigerating space the plates shift to close the openings and thus render the side and bottom walls imperforate to prevent the escape of the cold air and corresponding loss of refrigerating energy.

Thus as shown in Figures 4 to 7, each of the drawers has a row of vertical slots or openings 6*a* in its side walls and a plurality of symmetrically arranged openings or slots 6*b* in its bottom wall. Extending lengthwise of the side walls are the closure plates 11 having openings 11*a* registering with the openings 6*a* and supported for endwise sliding movement by means of suitable clips 11*b* fixed to the drawer walls. These plates are preferably mounted on the inner face of the vertical side walls and pivotally connected with the rear ends of the plates are short push rods 12 passing through the rear wall of the drawer and having circular pads or discs 12*a* at their ends bearing against the back wall of the refrigerator, and coil springs 13, 13 mounted on the rods between the pads and the wall of the drawer.

Figure 5:
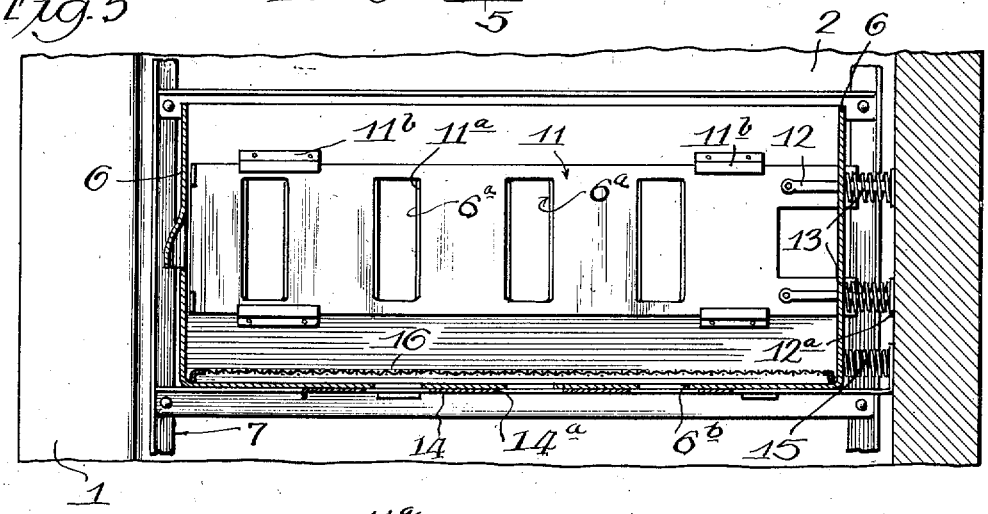
Figure 5 is an enlarged view of one of the drawers in vertical section as taken on line 5—5 of Figure 4.
Figure 6:
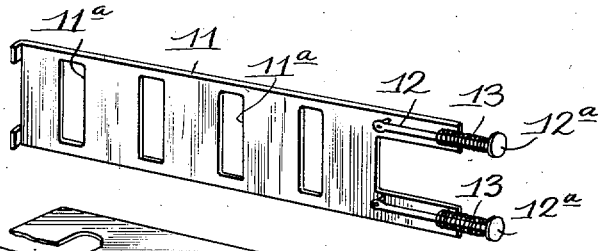
Figures 6 and 7 are perspective views of the side and bottom plates, respectively, for closing the openings in the corresponding walls of the drawers.
Figure 7:
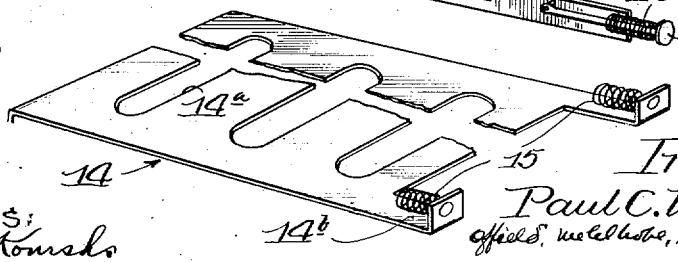

Similarly on the bottom wall of each drawer is mounted a sliding plate 14 having openings 14*a* normally registering with the openings 6*b* in the bottom wall when the drawer is closed. Between the openings 14*a* in the plate are solid sections which cover the openings in the drawer bottom when the plate slides rearwardly as the drawer is opened by the expansion of a pair of stiff compression springs 15, 15. These springs are mounted at the rear corners of the plates by means of rearwardly extended fingers 14*b*, 14*b* having upturned ends against which one end of each spring is fastened, their free ends bearing against the rear wall of the drawer, as shown in Figures 5 and 7. A rack or auxiliary bottom 16 of wire mesh or other perforated material is preferably placed in the bottom of the drawers to support the contents above the slotted bottom wall, and for obvious reasons.

As shown in Figure 5, each drawer in its normal and closed position has its side and bottom wall openings uncovered by their respective plates 11 and 14 by reason of the contact of their rearwardly extended push rods and fingers in contact with the back wall of the refrigerating space, thus bringing the openings in the plates into register with the openings in the drawer walls.

Now when the drawer is pulled out forwardly, the compression springs 13 and 15 are released and now act to slide the plates rearwardly and thus close the openings in the side and bottom walls. On returning the drawer to its closed position, the push rods and fingers again come into contact with the back wall of the refrigerator sliding the plates into slot-opening position and holding them in such position until the drawer is again opened.

Figure 2:
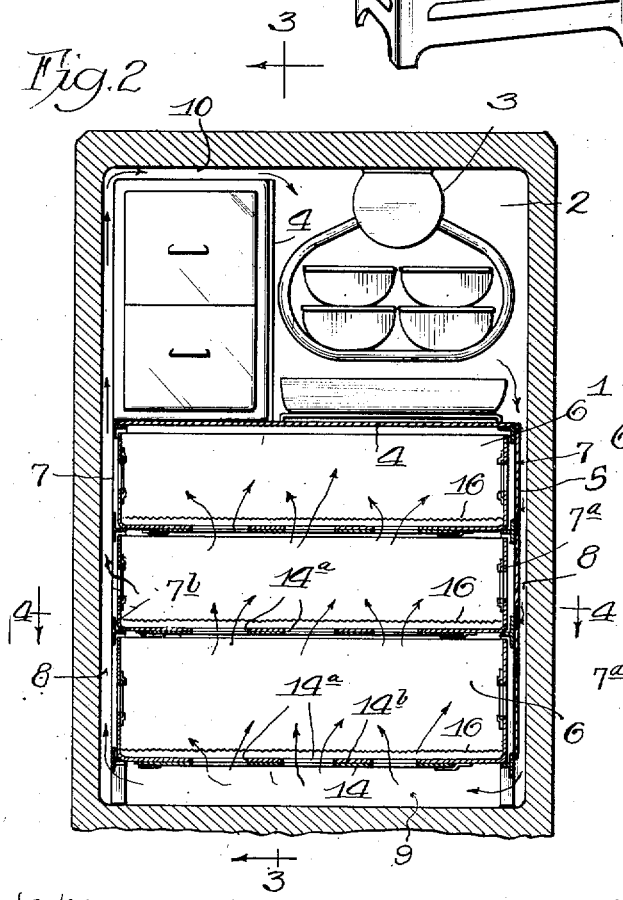
Figure 2 is an enlarged detail view in vertical section through the storage space showing the circulating system and the division of the storage space.
Figure 3:
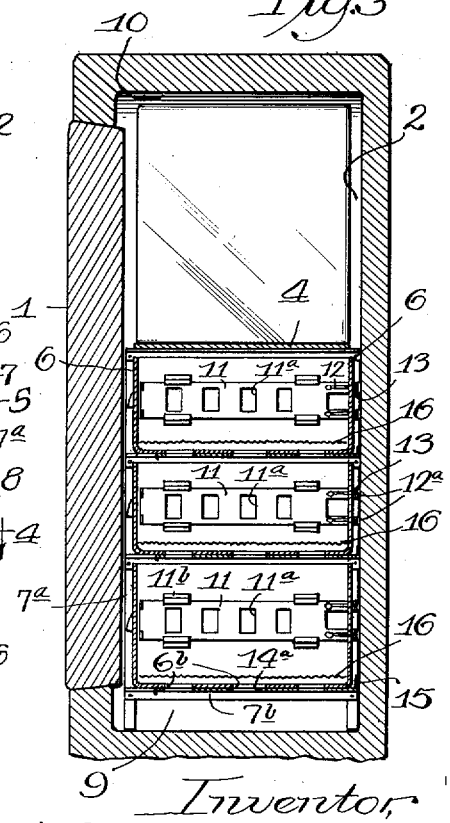
Figure 3 is another detail view in vertical section as taken on line 3—3 of Figure 2.
Figure 4:
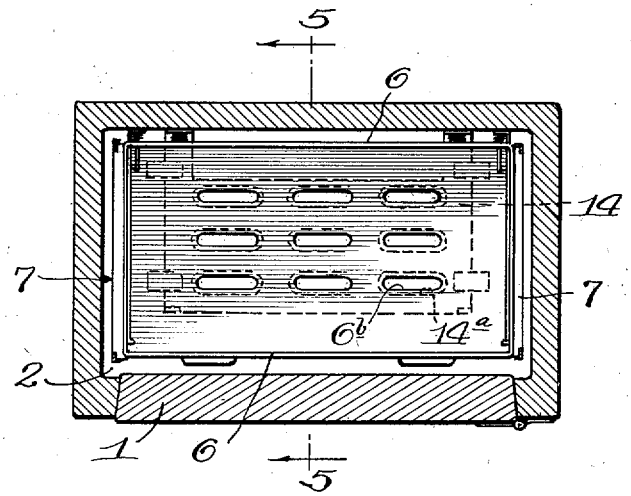
Figure 4 is a view in cross section through the storage space and one of the drawers, as taken on line 4—4 of Figure 2.

In a refrigerator thus designed and constructed the usual refrigerating process takes place, viz: the heat is extracted from air by the cooling unit and the colder air follows a downward path along one (right) side of the storage compartment (as indicated by the arrows in Figure 2) to the space 9 at the bottom, thence breaking up into streams flowing upwardly through the bottom openings in the drawers, and laterally through the side openings into the vertical passage on the left side of the storage compartment, eventually finding its way to the top of the compartment as it absorbs heat and becomes warmer, and thence is returned to the cooling unit compartment through the passage 10.

The advantage of this construction for refrigerators is one of promoting greater economy as well as convenience. In the first place, the constant and complete circulation of the cold air throughout the refrigerating space is productive of more uniform temperature conditions and consequently better refrigeration. Again, loss of cooling efficiency by the frequent opening of the refrigerator door is eliminated by the use of the drawers, instead of the customary shelves. The colder air within the refrigerator is considerably heavier than the surrounding air, so that on opening the door of the ordinarily designed refrigerator, there is nothing to prevent the air from falling forwardly through the opening, with an attendant loss of effective cooling value, since the cold air thus lost is replaced by the warmer outside air which must be cooled down to the normal refrigerating temperature after the door is closed. With the use of drawers, however, the cooling space is not exposed to the outside atmosphere when the door is opened, and when one of the drawers is withdrawn its side and bottom walls become imperforate, thereby effectively retaining its volume of cold air, since the colder air cannot descend and does not tend to ascend and mingle with the warmer exterior atmosphere. Thus after removing food from or placing it in the open drawer, it is returned with the volume of cold air practically intact.

From the standpoint of convenience, the drawers are vastly more satisfactory than shelves, since articles of food can be more systematically and compactly arranged and readily accessible from above, thus avoiding the inconvenience of removing or reaching around certain articles to obtain those behind, as is the necessary procedure in a shelf-equipped refrigerator.

Having set forth the novel features and advantages of my refrigerator construction, I claim as my invention:

1. A refrigerator comprising a storage space, a drawer in said storage space slidable outwardly thereof, said drawer having a wall provided with openings adapted to permit free circulation therethrough when said drawer is in closed position, a slidable closure member on said drawer having openings arranged to register with the openings of said wall when the drawer is closed, and means acting on said closure member to effect relative shifting of the same with respect to said drawer in a direction to close said opening during the initial portion of the outward movement of said drawer and arranged to abut a stationary portion of the refrigerator interior to effect relative shifting movement of said closure member in the opposite direction to uncover said openings during the final portion of the movement of said drawer to closed position.

2. A refrigerator comprising a storage space having a door opening thereinto, a drawer in said storage space slidable outwardly through the door opening, said drawer having walls provided with openings adapted to permit free circulation therethrough when said drawer is in closed position, slidable closure members on said drawer, and spring actuated means normally holding said closure members in position to uncover said openings and acting to shift the same to close said openings when said drawer is shifted into open position.

3. A refrigerator comprising a storage space having a door opening thereinto, a drawer in said storage space slidable outwardly through the door opening, said drawer having walls provided with openings adapted to permit free circulation therethrough when said drawer is in closed position, slidable closure members on said drawer, and having portions adapted to contact with the wall of said storage space when the drawer is in closed position, and springs acting to shift said closure members to close said openings in the movement of said drawer from said storage space.

4. A refrigerator comprising a storage space, a drawer member in said space slidable outwardly thereof and comprising side and bottom walls, one of said walls being provided with air circulation openings therein, a slidable closure member for said openings carried by said drawer and arranged for limited shifting movement relatively to the drawer to close said openings as the drawer is moved outwardly and to uncover said openings as the drawer approaches fully closed position, and actuating means for said closure member carried by said drawer and projecting beyond a wall thereof for contact with a stationary portion of the refrigerator interior and arranged to effect the relative shifting of said member with respect to said drawer to close said openings during the outward movement of the drawer and arranged to re-engage said portion of the interior to effect relative movement of said member in the opposite direction with respect to said drawer to close said openings as the drawer is moved toward fully closed position.

PAUL C. WARREN.